United States Patent
Won et al.

(10) Patent No.: US 8,325,197 B2
(45) Date of Patent: Dec. 4, 2012

(54) METHOD AND APPARATUS FOR HIGH-SPEED IMAGE PROCESSING BASED ON GRAPHIC PROCESSING UNIT

(75) Inventors: Seok-Jin Won, Seongnam-si (KR); Yun-Je Oh, Yongin-si (KR); Sung-Dae Cho, Yongin-si (KR); Tae-Hwa Hong, Seoul (KE); Soo-Kyun Kim, Seoul (KR); Min-Woo Lee, Suwon-si (KR); In-Kyu Park, Incheon (KR); Man-Hee Lee, Incheon (KR)

(73) Assignees: Samsung Electronics Co., Ltd., Samsung-ro, Yeongtong-gu, Suwon-si, Gyeonggi-do (KR); Inha-Industry Partnership Institute, Yonghyeon-Dong, Nam-Gu, Incheon (KR)

( * ) Notice: Subject to any disclaimer, the term of this patent is extended or adjusted under 35 U.S.C. 154(b) by 1304 days.

(21) Appl. No.: 12/012,697

(22) Filed: Feb. 5, 2008

(65) Prior Publication Data

US 2008/0186313 A1 Aug. 7, 2008

(30) Foreign Application Priority Data

Feb. 6, 2007 (KR) .................. 10-2007-0012215

(51) Int. Cl.
*G09G 5/00* (2006.01)
*G06T 1/20* (2006.01)

(52) U.S. Cl. ..................... 345/582; 345/506

(58) Field of Classification Search .......... 345/506, 345/582
See application file for complete search history.

(56) References Cited

U.S. PATENT DOCUMENTS 6,046,747 A * 4/2000 Saunders et al. ............. 345/582
2004/0012563 A1* 1/2004 Papakipos et al. ........... 345/157

FOREIGN PATENT DOCUMENTS

| KR | 2001-113669 | 12/2001 |
| KR | 2004-86481 | 10/2004 |
| KR | 2006-44935 | 5/2006 |

OTHER PUBLICATIONS

Acharya et al. A Survey on Lifting-based Discrete Wavelet Transform Architectures. Journal of VLSI Signal Processing 42. 2006. pp. 321-339.*
Movva et al. A Novel Architecture for Lifting-Based Discrete Wavelet Transform for JPEG2000 Standard suitable for VLSI implementation. Proceedings of the 16th International Conference on VLSI Design. 2003. pp. 202-207.*
Simon Green, "The OpenGL Framebuffer Object Extension," GDC Presentation, slides 1-34, Mar. 11, 2005.*

(Continued)

*Primary Examiner* — Jacinta M Crawford
(74) *Attorney, Agent, or Firm* — Cha & Reiter, LLC

(57) ABSTRACT

A method for high-speed image processing based on graphic processing unit includes processing an input image for the image processing in a texture format of a 32 bit floating point, and performing a predetermined algorithm for the image processing on the input image through at least one or more Framebuffer Object (FOB) and outputting the result as texture data.

15 Claims, 4 Drawing Sheets

OTHER PUBLICATIONS

Rabbani, Majid, et al.; "An Overview of the JPEG 2000 Still Image Compression Standard;" Signal Processing Image Communication; 17; 2002; p. 3-48.

Taubman, David; "High Performance Scalable Image Compression with EBCOT;" IEEE Transactions on Image Processing, vol. 9, No. 7; Jul. 2000; p. 1158-1170.

Adams, Michael D., et al.; "JasPer: A Software-Based JPEG-2000 Codec Implementation;" IEEE; 2000; p. 53-56.

Skodras, Athanassio, et al.; "The JPEG 2000 Still Image Compression Standard;" IEEE Signal Processing Magazine; Sep. 2001; p. 36-58.

Sweldens, Wim; "The Lifting Scheme: A New Philosophy in Biorthogonal Wavelet Constructions;" 12 pgs.

Cho et al.; Accelerating DWT in JPEG2000 Using GPU; Feb. 2007.

* cited by examiner

METHOD AND APPARATUS FOR HIGH-SPEED IMAGE PROCESSING BASED ON GRAPHIC PROCESSING UNIT

CLAIM OF PRIORITY

This application claims the benefit of the earlier filing date, under 35 U.S.C. §119(a), to that patent application entitled "Method And Apparatus For High-Speed Image Processing Based On Graphic Processing Unit" filed in the Korean Intellectual Property Office on Feb. 6, 2007 and assigned Serial No. 2007-12215, the contents of which are hereby incorporated by reference.

BACKGROUND OF THE INVENTION

1. Field of the Invention

The present invention relates to a high-speed image processing technique, and more particularly to a method for implementing a high-speed compression algorithm for JPEG2000 still images through general purpose application of graphic processing unit.

2. Description of the Related Art

Recently, the performance of Graphics Processing Units (GPU) has rapidly developed, and programmable features of the GPU itself have gradually increased. Accordingly, the possibility of general purpose application of the GPU was proposed in addition to a basic geometry transformation and a rasterization for 3-dimensional graphics. (See R. Fernando (editor), *GPU Gems: Programming Techniques Tips, and Tricks for Real-Time Graphics*, Addison-Wesley, 2004; M. Pharr (editor), *GPU Gems 2: Programming Techniques for High-Performance Graphics and General-Purpose Computation*, Addison-Wesley, 2005; http://developer.nvidia.com/page/documentation.html; and http://ati.amd.com/developer/index.html). Operational processing rates of GPUs are significantly (e.g., ten times) faster than a corresponding performance of the newest Central Processing Unit (CPU). For example, a NVIDIA G80 (GeForce 8800 GTX), which is the newest GPU core, can perform ultra-high-speed operations that correspond to approximately 7 hundred million transistor integration and 350 giga-flops (GFLOP). NVIDIA is a registered trademark of NVIDIA Corporation, Santa Clara, Calif.

Another development tendency of the GPU is that it allows the user to program functions of the GPU internal pipelines. This method is known as a vertex shader and a pixel/fragment shader technique, etc. For example, changing type of a projection transformation or an illumination model or a texture mapping method, or realistic graphic effects, which are not available in conventional fixed pipelines, can be achieved by redefining the graphic pipeline functions by means of shaders. DirectX 9.0 and OpenGL 2.0 were announced, wherein shader programming using HLSL (High Level Shading Language) and OpenGL Shading Language (GLSL) were included in standard specifications of DirectX and OpenGL (Open Graphics Library). As a result, the development of general purpose applications using high-performance operations of the GPU is expected to be accelerated.

Special effects in computer graphic field, such as a bump mapping, environment mapping, particle effect, collision detection, etc., which are not supported directly by the API of OpenGL or the DirectX, have come to be implemented. (See R. Fernando (editor), *GPU Gems: Programming Techniques, Tips, and Tricks for Real-Time Graphics*, Addison-Wesley, 2004; M. Pharr (editor), *GPU Gems 2: Programming Techniques for High-Performance Graphics and General-Purpose Computation*, Addison-Wesley, 2005).

For the GPU application for general purpose, i.e. General Purpose GPU (GPGPU), an image processing and a computer vision, in addition to computer graphics, have been in the spotlight in recent years. Frequent transmissions of image data and a real-time data processing on pixels, pixel blocks or features is essential to algorithms for the image processing and computer vision, which are common features with 3-dimensional graphic algorithms. In terms of the technical trend the GPU is not only applicable to personal computers (PC), but also mobile devices, such as mobile phones and PDAs, and the GPU is expected to serve as a multi-processor in the future.

SUMMARY OF THE INVENTION

Accordingly, the present invention enables a high-speed algorithm for a JPEG2000 still image, and especially a Discrete Wavelet Transform (DWT), which is a core module of the JPEG2000 algorithm, to be implemented through general purpose application of an advanced GPU.

In accordance with an aspect of the present invention, there is provided a method for a high-speed image processing based on graphic processing unit, the method includes the steps of processing an input image for the image processing in a texture format of a 32 bit floating point and performing a predetermined algorithm for the image processing on the input image through at least one Framebuffer Object (FOB) and outputting the result as texture data. Framebuffer Object is an extension of OpenGL.

In accordance with another aspect of the present invention, there is provided an apparatus for a high-speed image processing based on a graphic processing unit, the apparatus includes a vertex shader performing a 3-dimensional geometry transformation to transform 3-dimensional vertexes into 2-dimensional coordinate system and determining vertex colors based on illumination and reflection properties, a rasterizer aligning data output from the vertex shader and transforming the data into fragments and a pixel shader performing shader operations based on the fragments provided from the rasterizer using texture data of a video memory, wherein the pixel shader comprises at least one Framebuffer Objects (FBO), which is provided with the input image for the image processing in a texture format of 32 bit floating point, performing a predetermined algorithm for the image processing on the input image and outputting the result as texture data so as to be reused.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE INVENTION

Exemplary embodiments of the present invention will be described with reference to the accompanying drawings. Further, various specific definitions found in the following description, such as specific component devices, etc., are provided to present a general understanding of the present invention, and it would be apparent to those skilled in the art that the specific definitions can be changed and modified without departing from the spirit and scope of the invention, as represented by the claims herein.

Figure 1:
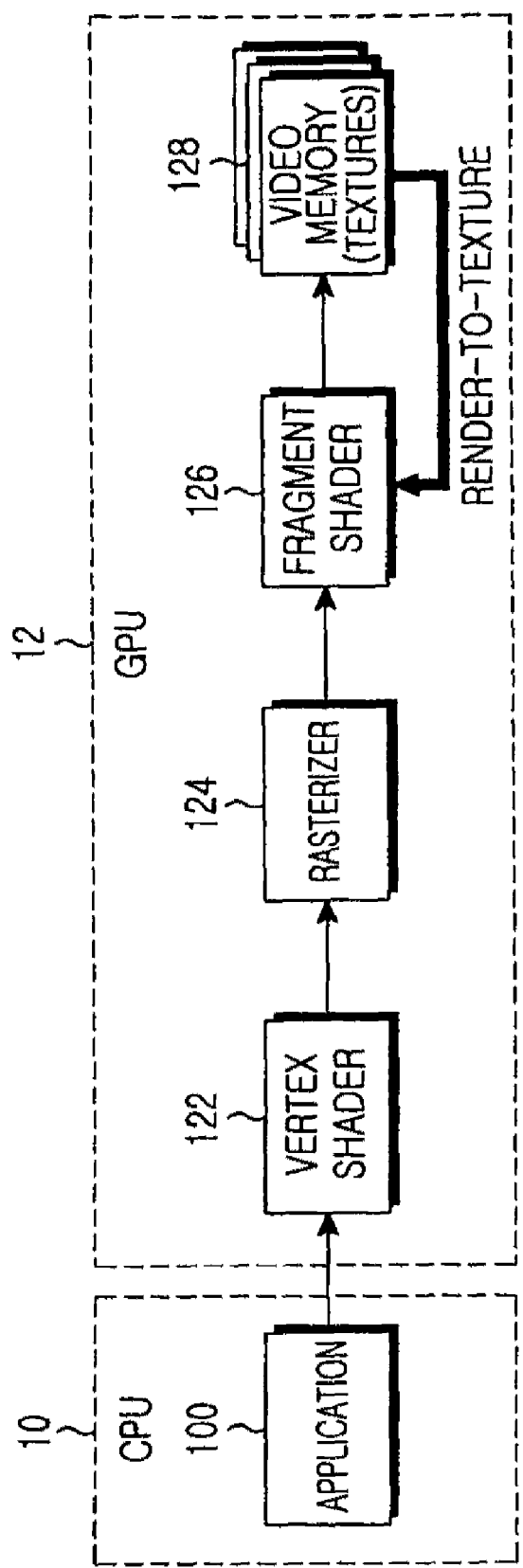
FIG. 1 is a block diagram illustrating the architecture of a programmable GPU pipeline to which the present invention is applied.

In the recent GPU, programmable features have been gradually increased, that allow users the ability to modify GPU pipelines by means of high level languages. FIG. 1 shows the architecture of a programmable GPU pipeline improved over a conventional fixed GPU pipeline, to which the present invention is applied. Referring to FIG. 1, a GPU 12 is provided with vertex data (and original data) from a CPU 10, which has been provided to an application 100 of the CPU 10, and performs a 3-dimensional geometry transformation, in which a 3-dimensional vertex is transformed into a 2-dimensional screen coordinate system. The GPU 12 also includes a vertex shader 122, a rasterizer 124, a pixel shader 126, and a video memory 128. The vertex shader 122 determines vertex colors based on illumination and reflection properties. The rasterizer 124 aligns data output from the vertex shader 122 again and transforms the data into fragments for processing of the following pixel shader 126. Based on the fragments provided from the rasterizer 124, the pixel shader 126 performs shader operations using texture data of the video memory 128. Here, the pixel shader 126 performs the shader operations and determines pixel colors within polygons in the 2-dimensional screen coordinate system. Such pixel shader 126 can be implemented by programs written in, for example, an OpenGL shading language, and is also referred to as a fragment shader or a fragment processor. Due to such architecture, the vertex shader 122 of the GPU 12 can change 3-dimensional Transformation and Lighting (T&L) structure and the pixel shader 126 can change a shading structure of the unit pixel.

A High-Level Shading Language (HLSL) in DirectX 9.0, released March 2004, and an OpenGL Shading Language (OGLSL) (See R. Rost, *OpenGL Shading Language*, Second Edition, Addison-Wesley, 2006) in an OpenGL 2.0, released in October. 2005, are representatives of the high-level shading languages. Recently, programmable shaders have been also included in OpenGL ES (embedded system) 2.0, which is a standard of a mobile OpenGL, for multimedia processing in any multimedia device, e.g., PC or mobile device, has come to be available by using the shaders. A conventional pipeline structure of the OpenGL ES 2.0 may be found at http://www.opengl.org.

In the latest technique trends, all of the developed algorithms, without exception, are implemented by using the shaders and aim for high-speed algorithms. In the fixed pipeline, algorithms to which a hardware acceleration can not be applied have been already accelerated by means of the shaders. Such tendency has extended to various fields besides graphics, and especially, application to which image processing is expected (See E. Larsen, Using the Graphics Processing Unit for Computer Vision, Tutorial in IEEE Conference on Computer Vision and Pattern Recognition, June 2006).

Meanwhile, library construction of the GPU-based image processing has not been disclosed. For the JPEG2000 image compression, which requires a transformation having large operation amount, such as a wavelet codec, no efficient GPU-based algorithms have been developed.

Accordingly, the present invention aims to implement a high-speed compression algorithm of the JPEG2000 still image through the general purpose GPU application using high-level shading languages.

The JPEG2000 is a new international standard for a wavelet-based still image compression and a still image compression algorithm for improving a conventional JPEG scheme. The JEG2000 has recently attracted much attention as a new image format for various application areas, such as digital cameras, mobile devices, medical image devices, remote sensing image devices, etc (See A. Skodras, C. Christopoulos, and T. Ebrahimi, "*The JPEG 2000 Still Image Compression Standard*," IEEE Signal Processing Magazine, vol. 18, no. 5, pp. 36-58, September 2001; M. Rabbani and R. Joshi, "*An overview of the JPEG2000 still image compression standard*," Signal Processing: Image Communication, vol. 17, no. 1, pp. 3-48, January 2002; and T. Acharya and P. Tsai, *JPEG2000 Standard for Image Compression*, Wiley-Interscience, 2005). The JPEG2000 has also registered as ISO/IEC and ITU international standard (See *JPEG2000 Image Coding System*, ISO/IEC International Standard 15444-1, ITU Recommendation T.800, 2000).

As described above, the present invention aims to construct a basic image processing environment for implementing a JPEG2000 codec by means of a GPU and the shading languages, and then to implement a core module of the JPEG2000 and especially a Discrete Wavelet Transform (DWT) module by means of the pixel shader.

Figure 2:
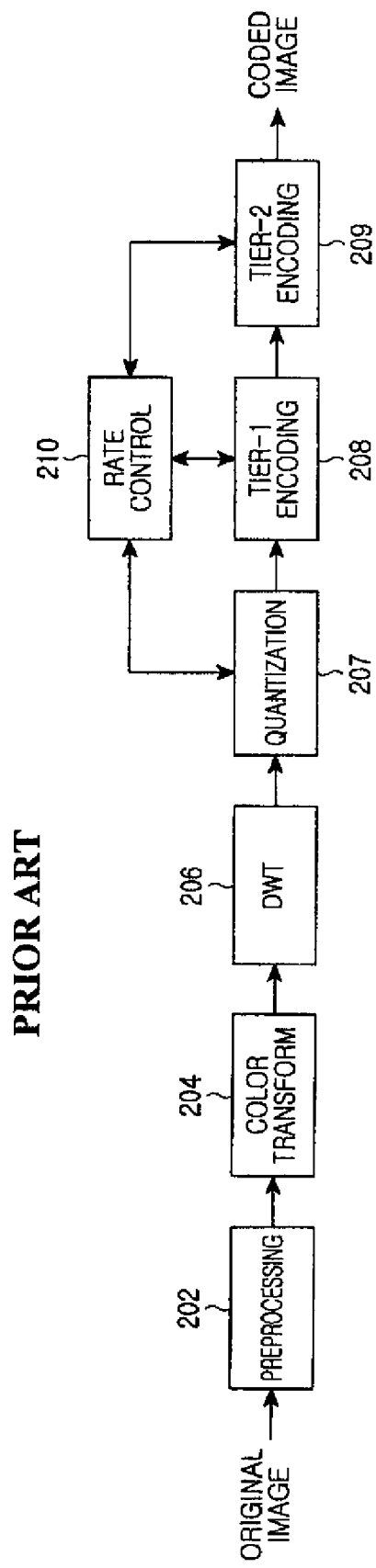
FIG. 2 is a block diagram illustrating a conventional JPEG2000 core encoder.

FIG. 2 shows a block diagram of a normal JPEG2000 core encoder. Referring to FIG. 2, the JPEG2000 which is intended to be implemented in the present invention will now be described. A JPEG2000 encoding includes preprocessing on input original image, such as tiling, which is performed in a preprocessing unit 202. Then, a color transform unit 204 transforms an RGB image into a YCbCr image. DWT 206 performs DWT transformation on the input signal. A quantization is performed in a quantization unit 207. Thereafter, entropy coding is performed in 'Tier-1" 208 and 'Tier-2" 209, and then a JPEG2000 coded image is obtained. Rate control unit 210 controls the transfer rate. A JPEG2000 decoding can be accomplished by carrying out the encoding procedure shown in FIG. 1 in reverse order so as to obtain the original image.

In order to implement the aforementioned DWT module of the JPEG2000, the present invention utilizes the pixel shader. The pixel shader determines the final color of each pixel in a frame buffer, for example, while the OpenGL outputs a rendering result on a screen. This process is carried out on each pixel in the frame buffer, and then such architecture provides a structural advantage to the image processing using the pixel shader. In case of the normal image processing, such as an improvement of image quality and a boundary detection, the operation is performed independently on each pixel and the output of the result is also stored in each pixel. Therefore, it is very appropriate that the utilization of the pixel shader in which the operation is performed pixel by pixel is applied on the image processing. At this time, the image to be processed is texturized and loaded in the texture memory. The pixel shader generates output pixels using the input from the texture memory. In this process, a user-desired image processing algorithm is implemented with the shading language and performed.

Such methods for performing the image processing using the pixel shader may be largely classified into an on-screen rendering and an off-screen rendering. In the on-screen rendering, rendering results are output to the frame buffer and are represented on the actual screen. In the off-screen rendering, the rendering is done internally in which the rendering results are stored in an internal buffer, and thus are not represented on the screen.

In the case of performing the image processing by using the on-screen rendering, since resulting images are stored in the frame buffer, significant time is spent on copying the contents of the frame buffer into a system memory. Since this copying occurs repeatedly when several steps of image processing are performed, the advantage of the image processing using the graphic hardware is lost.

Accordingly, the utilization of the off-screen rendering has been a mainstream of the image processing. Such off-screen rendering has also been known as a Render-To-Texture (RTT) since the rendering results are stored directly as texture. As the programmable GPU architecture and shading languages supporting the programmable GPU architecture have gradually advanced, various kinds of RTT methods have been introduced.

There is a texture copy method in which the contents of the frame buffer are copied in the form of texture by using a function of 'CopyTexSubImage' in order to store the rendering results in the form of texture. Since the contents of the frame buffer are copied simply in the form of texture, this method has the same problem as in the on-screen rendering.

To perform the off-screen rendering while overcoming the problems of the texture copy method, a 'pbuffer' method has appeared. In the pbuffer method, a current frame buffer and a context internally create an identical buffer and output the rendering results to the pbuffer. However, the pbuffer and the frame buffer can not internally share the textures or display lists with each other in this method. Also, a context switching in the course of changing a rendering target requires significant time.

A Framebuffer Object (FBO) method has newly appeared to solve such problems. Since one context exists in the FBO, the time needed for the context switching is shorter than that of the pbuffer. Also, since textures are shared in each frame buffer, the usage of memory can be reduced, and the rendering results can be used again as input for a next rendering. Consequently, the FBO provides many advantages for image processing.

The present invention implements the DWT for the image compression in JPEG2000 by utilizing such pixel shader. When the DWT is performed to compress images in JPEG2000, the extent of data increases twice as each step of DWT is performed. After a step is repeated several times, a quantization is carried out. In the case in which the DWT is implemented using the GPU, the DWT is carried out by one series of a rendering process, and the quantization may be consequently carried out every step due to data precision. Therefore, results having increased error size may be obtained. In the present invention, the DWT is carried out on the condition that input and output images are specified as 32 bit floating point texture so as to eliminate the quantization in the intermediate steps. By specifying the textures as the 32 bit floating point format, data precision of output is increased and the textures in the form of data rather than normal images can be processed in the GPU. In order to use the 32bit floating point textures, an 'ARB_texture_rectangle' and an 'ARB_texture_float' extension is used.

Figure 3:
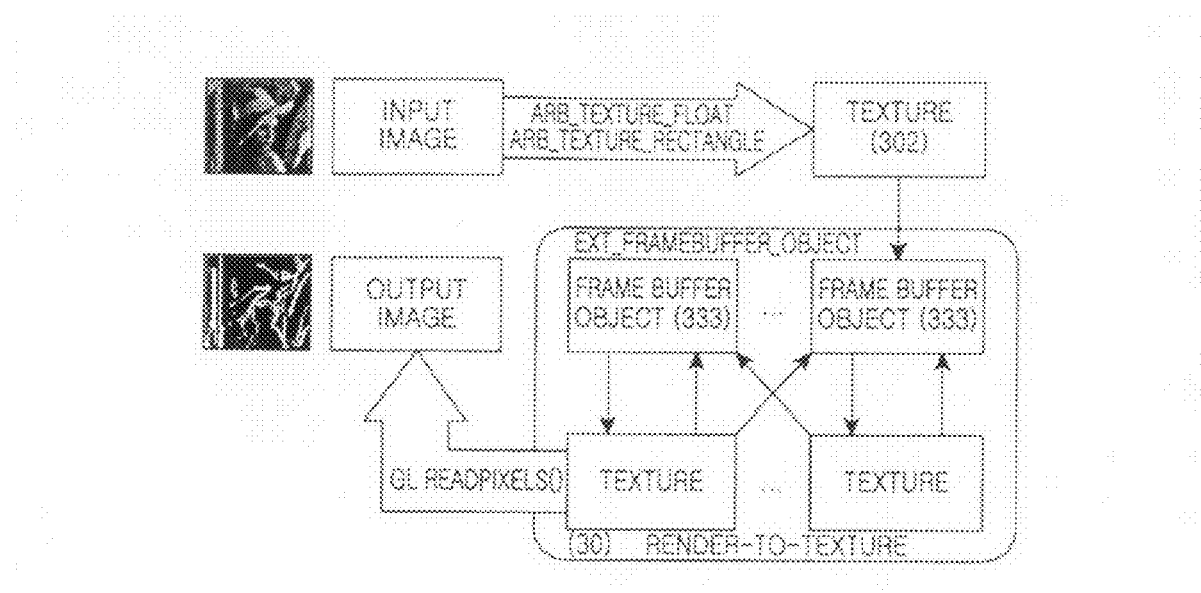
FIG. 3 is a view illustrating a basic architecture of an image processing framework using the GPU and a pixel shader according to the present invention.

FIG. 3 shows a basic architecture of image processing framework using the GPU and the pixel shader according to the present invention. Referring to FIG. 3, in the GPU according to the present invention, the pixel shader 30 is first provided with texture data 302 of 32 bit floating point data as input, and the pixel shader 30 processes it. Here, the pixel shader includes at least one FBO 333, each of which performs a corresponding set function thereof and outputs texture data as the output of the performing of the corresponding set function.

That is, the input image as texture data, which is the object of the image processing, is loaded into the video memory. The pixel shader performs a specified algorithm of image processing on the input image and then outputs the results as texture data to the FBO again. As described above, this process is the off-screen rendering or the render-to-texture and is a feedback architecture in which the processing results of the pixel shader are transferred not to the frame buffer, which is a basic output object, but to the texture memory so that it can be reused. The application performs a rectangular rendering corresponding to an entire screen and binds the contents of FOBs as texture. As a result, the image processing results of the pixel shader are rendered to a viewport. In addition, the input and output textures can be specified in 32 bit real number so as to represent the floating point data to be generated during the image processing. Also, one useful feature of the FBO is that the input textures and the output textures can be specified to be equal to each other. Hence, the performing time can be shortened and the usage of the memory can be reduced because the output results can be directly used as the input without any additional process.

As described above, in order to implement the DWT according to the present invention using the implemented pixel shader, a convolution-based DWT and a lifting-based DWT, which are two generally well-known methods for implementing the DWT, are implemented to perform a comparison of performances. The convolution-based DWT, similar to convolution methods in a normal image processing, multiplies the input signal by predetermined values of a low pass filter and a high pass filter so as to separate the input image into a high frequency component and a low frequency component. Equations 1 and 2 below show a scheme of performing the convolution-based DWT. In equations 1 and 2, the low frequency components $y_L(n)$ and and high frequency components $y_H(n)$ of the input signal are obtained by using the low pass filter $h(i)$ and the high pass filter $g(i)$ on the input signal $x(n)$.

$$y_L(n) = \sum_{i=0}^{\tau_L-1} h(i)x(2n-i) \tag{1}$$

$$y_H(n) = \sum_{i=0}^{\tau_H-1} g(i)x(2n-i) \tag{2}$$

Figure 4:
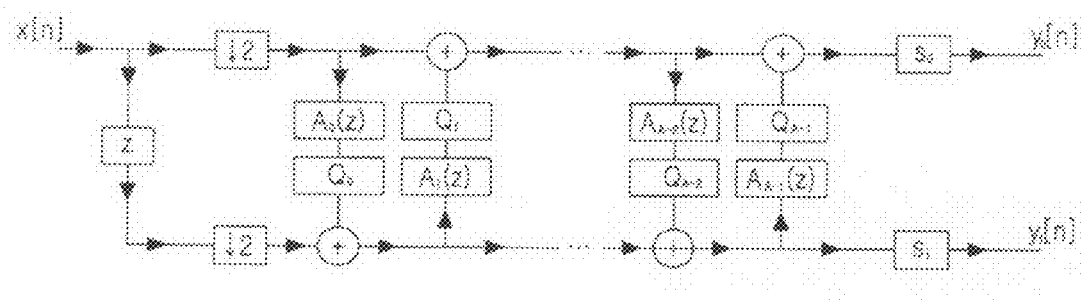
FIG. 4 is a schematic view illustrating a conventional lifting-based DWT scheme.

The present invention implements the lifting-based DWT (see Sweldens, "*The Lifting scheme: a new philosophy in biorthogonal wavelet constructions*," Proc. SPIE, vol. 2569: Wavelet Applications in Signal and Image Processing III, pp. 68-79, September 1995) which is another method for performing the DWT. The lifting-based DWT reduces the number of operations to be less than that of the convolution-based DWT, thereby providing faster performing time. FIG. 4 schematically shows the lifting-based DWT process.

A polyphase matrix of 9/7 tab DWT, which means an irreversible transform, is shown in equation 3.

$$\tilde{p}(z) = \begin{bmatrix} 1 & \alpha(1+z^{-1}) \\ 0 & 1 \end{bmatrix} \begin{bmatrix} 1 & 0 \\ \beta(1+z) & 1 \end{bmatrix} \begin{bmatrix} 1 & \gamma(1+z^{-1}) \\ 0 & 1 \end{bmatrix} \begin{bmatrix} 1 & 0 \\ \delta(1+z) & 1 \end{bmatrix} \begin{bmatrix} K & 0 \\ 0 & 1/K \end{bmatrix} \quad (3)$$

The operation of the above equation 3 can be performed by a six-step process of equation 4.

(S1) $Y_{2n+1} = X_{2n+1} + \alpha \times (X_{2n} + X_{2n+2})$  $\alpha = -1.586134342$, (S2) $Y_{2n} = X_{2n} + \beta \times (Y_{2n-1} + Y_{2n+1})$  $\beta = -0.052980118$, (S3) $Y_{2n+1} = Y_{2n+1} + \gamma \times (Y_{2n} + Y_{2n+2})$  $\gamma = 0.882911075$, (S4) $Y_{2n} = Y_{2n} + \delta \times (Y_{2n-1} + Y_{2n+1})$  $\delta = 0.443506852$, (S5) $Y_{2n+1} = -K \times Y_{2n+1}$  $K = 1.230174105$, and (S6) $Y_{2n} = Y_{2n}/K$ (4)

Table 1 shows the number of the operation of the convolution-based DWT and the lifting-based DWT. As can be seen in Table 1, the number of operations of the lifting-based DWT is reduced by about ⅓ in comparison with the convolution-based DWT.

TABLE 1

| Filter | Convolution Scheme | | Lifting Scheme | |
|---|---|---|---|---|
| | Multiplications | Additions | Multiplications | Additions |
| 5/3 | 4 | 6 | 2 | 4 |
| 9/7 | 9 | 14 | 6 | 8 |

In the implementing process of DWT using the GPU according to the present invention, all of the input images are specified in the 32 bit floating point texture format according to the feature of the present invention.

At first, in the case of the convolution-based DWT, a total of two renderings are performed on a horizontal DWT and a vertical DWT, respectively. At this time, for each of the horizontal and vertical DWT, one FOB is prepared and the renderings are performed after the input textures are specified by the textures of the previous results. During the rendering processes, the operations through access to adjacent pixels based on the current pixel are performed for each pixel.

In the lifting-based DWT, for each of a horizontal DWT and a vertical DWT, one FOB is also previously prepared and then the renderings are performed using the two FBOs. Here, in the lifting process, input textures are specified by output textures itself using one FBO, and thus, the advantage of the FOB is utilized. In the lifting-based DWT, the last three steps among the six steps of the above equation 4 are performed by one rendering. Therefore, four renderings are performed on the horizontal and vertical DWT, respectively. Since the input textures and the output textures are specified to be equal to each other in the four rendering processes, the time required for transfers between the memories can be reduced.

The JPEG2000 main module was implemented by means of the image processing framework using the GPU proposed in the present invention. A performing rate difference is measured through performances on the GPU and CPU, respectively. These measurement experiments were performed in a graphic card mounting an NVIDIA GeForce 7800 GTX(G70) GPU with 256 MB of video memory, and a PC mounting an AMD Athlon64 2.0 GHz CPU and 2 GB of main memory, respectively. NVIDIA GeForce is a registered trademark of NVIDIA Corporation, Santa Clara, Calif. AMD Athlon is a registered trademark of Advanced Micro Devices Corporation, Sunnyvale, Calif.

Figure 5A:
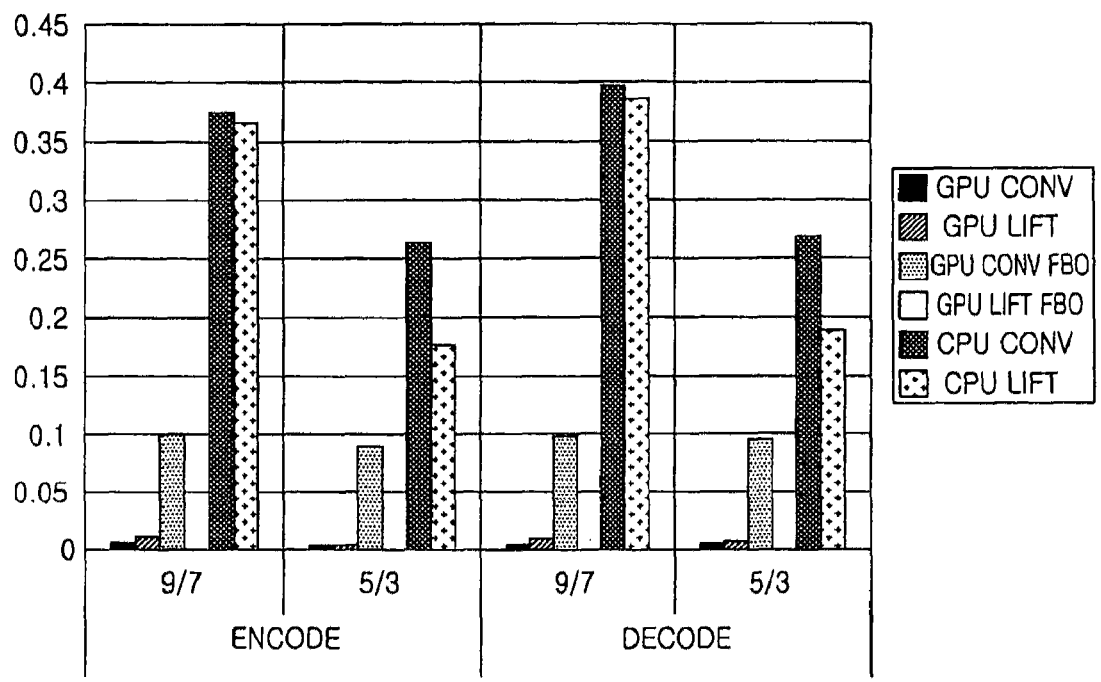
FIGS. 5A and 5B are graphs illustrating performance test results of a GPU-based DWT according to the present invention.
Figure 5B:
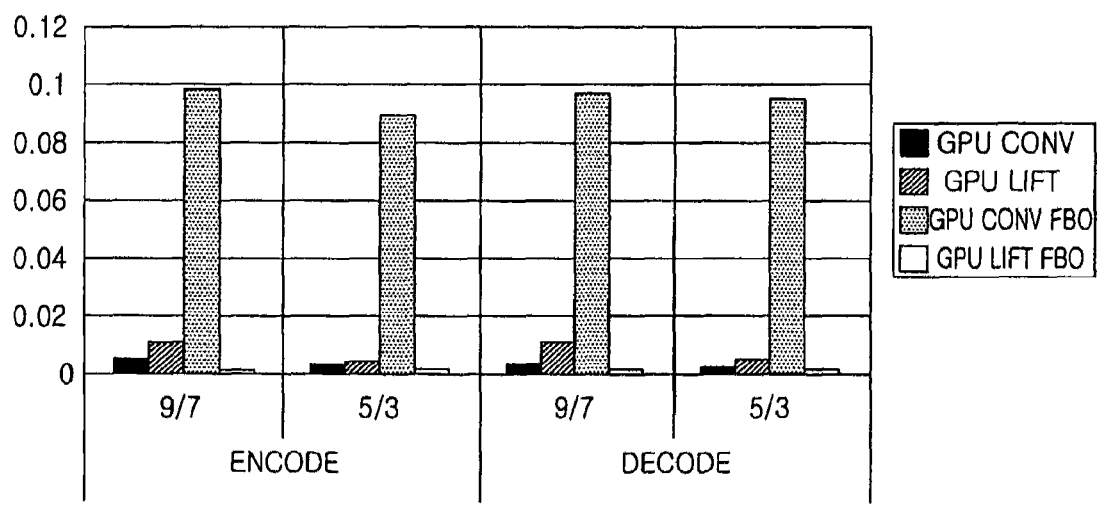

FIGS. 5a and 5b, and Table 2 show graphs and data of results of performing the DWT on an image of 512×512 resolutions. That is, the graphs and data include the results from experiments in which the DWT is performed not using the render-to-texture, but using 'CopyTexSubImage' (these are illustrated as a 'GPU Conv' and a 'GPU Lift' in FIGS. 5a and 5b), and results from experiments in which the DWT are performed using the FOB according to the present invention (these are illustrated as a 'GPU Conv FBO' and a 'GPU Lift FBO' in FIGS. 5A and 5B), and the results from experiments in which the DWT are performed using the CPU (these are illustrated as a 'CPU Conv' and a 'CPU Lift'). The experiment results shown in FIGS. 5A and 5B, and Table 2 are obtained from comparisons of times used for pure operations, except for times of an OpenGL initialization and a shader compilation.

TABLE 2

| 512 × 512 | CopyTexSubImage | | FBO | | CPU | |
|---|---|---|---|---|---|---|
| | Convolution | Lifting | Convolution | Lifting | Convolution | Lifting |
| ENCODE | 0.003238 | 0.007891 | 0.0985 | 0.000519 | 0.37419 | 0.3646 |
| Ratio (/FBO) | 0.0329 | 15.207 | 1 | 1 | 3.8 | 702.548 |

As can seen in FIG. 5A, the CopyTexSubImage has about ¹⁄₄₀ to ¹⁄₁₀₀ the perfoming time relative to those of the CPU. Comparing the FOB of the present invention with the CopyTexSubImage, as can seen in FIG. 5B, the performing time of the convolution-based DWT is increased, but the performing time of the lifting-based DWT is decreased by about ¹⁄₁₅.

From comparison between the convolution-based DWT and the lifting-based DWT for the CopyTexSubImage in FIG. 5A, it is noted that the convolution-based DWT is more rapidly performed than the lifting-based DWT. This is contrary to the known fact that the lifting-based transform process has a smaller number of operation than that of the convolution-based transform process and the performing time of the lifting-based transform process is thus shorter than that of the convolution-based transform process.

The reason for this may be the number of renderings in the GPU-based transform. Two renderings are performed in the horizontal direction and vertical direction of 2-dimensional image in the convolution-based DWT. A total of eight renderings are performed in the lifting-based DWT because, as shown in equation 4, four rendering are needed for each one direction transform. Since a 'copy-to-texture' operation is performed at each rendering in order to reuse the contents of the frame buffer as texture, although the number of the operation of the lifting-based DWT is decreased, the lifting-based DWT becomes slower than the convolution-based DWT due to the increase of the number of the rendering thereof.

In the case of utilizing the FBO according to the present invention, the time in the lifting-based DWT is decreased by about 1/200 relative to that of the convolution-based DWT. Such results may be translated as the following. In the case of the lifting-based DWT, the performing time is decreased because the time, which is needed to again generate the textures from the output results of the frame buffer in the conventional CopyTexSubImage, is removed by using the FOB. In the case of the convolution-based DWT, since the input and output formats are changed, the performing time of the convolution-based DWT, which has relatively more access to the textures, is significantly increased.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered using a general purpose computer, or a special processor or in programmable or dedicated hardware, such as an ASIC or FPGA or a GPU. As would be understood in the art, the computer, the processor or the programmable hardware or GPU include memory components, e.g., RAM, ROM, Flash, etc. that may store or receive software or computer code that when accessed and executed by the computer, processor or hardware implement the processing methods described herein.

As described above, the GPU-based JPEG2000 DWT module according to the present invention can be implemented. While the invention has been shown and described with reference to certain exemplary embodiments thereof, it will be understood by those skilled in the art that various changes in form and details may be made therein without departing from the spirit and scope of the invention. Accordingly, the present invention should in no way be limited to the illustrative embodiments but may be defined by the scope of the appended claims along with their full scope of equivalents.

As described above, the present invention allows the high-speed compression algorithm, and especially the DWT algorithm, which is a core module of the JPEG2000 to be implemented through the GPU general purpose application.

What is claimed is:

1. A method for processing an image at high-speed based on a graphic processing unit, the method comprising:
    processing an input image in a texture format of a 32 bit floating point;
    performing a predetermined Discrete Wavelet Transform (DWT) algorithm for the image processing on the input image through at least one Framebuffer Object (FBO), wherein each one FBO is previously prepared for a horizontal DWT and a vertical DWT to be used for a rendering; and
    outputting the result as texture data.

2. The method of claim 1, wherein the performing of the predetermined DWT algorithm for the image processing on the input image through the FBO is a convolution-based DWT, each one FBO is previously prepared for a horizontal DWT and a vertical DWT, and the total of two renderings are performed.

3. The method of claim 2, wherein the convolution-based DWT is a scheme which obtains a low frequency component $y_L(n)$ and a high frequency component $y_H(n)$ of an input signal x(n) by using a lowpass filter h(i) and a highpass filter g(i) on the input signal x(n) as $$y_L(n) = \sum_{i=0}^{\tau_L - 1} h(i)x(2n - i)$$

and $$y_H = \sum_{i=0}^{\tau_H - 1} g(i)x(2n - i).$$

4. The method of claim 1, wherein the performing of the predetermined algorithm for the image processing on the input image through the FOB is a lifting-based Discrete Wavelet Transform DWT.

5. The method of claim 4, wherein the lifting-based DWT is a scheme according to (S1) $Y_{2n+1} = X_{2n+1} + \alpha \times (X_{2n} + X_{2n+2})$ $\alpha = -1.586134342$ (S2) $Y_{2n} = X_{2n} + \beta \times (Y_{2n-1} + Y_{2n+1})$ $\beta = -0.052980118$ (S3) $Y_{2n+1} = Y_{2n+1} + \gamma \times (Y_{2n} + Y_{2n+2})$ $\gamma = 0.882911075$ (S4) $Y_{2n} = Y_{2n} + \delta \times (Y_{2n-1} + Y_{2n+1})$ $\delta = 0.443506852$ (S5) $Y_{2n+1} = -K \times Y_{2n+1}$ $K = 1.230174105$, and (S6) $Y_{2n} = Y_{2n}/K.$ 6. An apparatus for a high-speed image processing based on graphic processing unit, comprising:
    a vertex shader performing a 3-dimensional geometry transformation to transform 3-dimensional vertexes into 2-dimensional coordinate system and determining vertex colors based on illumination and reflection properties;
    a rasterizer aligning data output from the vertex shader and transforming the aligned data into fragments; and
    a pixel shader performing shader operations based on the fragments provided from the rasterizer using texture data of a video memory,
    wherein the pixel shader comprises at least one Framebuffer Object (FBO) which is provided with the input image for the image processing in a texture format of 32 bit floating point, performing a predetermined convolution-based Discrete Wavelet Transform (DWT) or lifting based DWT algorithm for the image processing on the input image including that each FBO is previously prepared for a horizontal DWT and a vertical DWT and outputting the result as texture data so as to be reused.

7. The apparatus of claim 6, further comprising a lowpass filter h(i) and a highpass filter g(i), said lowpass filter and highpass filter obtaining a low frequency component $y_L(n)$ and a high frequency component $y_H(n)$ of an input signal x(n), respectively, for the convolution-based DWT.

8. The apparatus of claim 7, wherein the low frequency and high frequency components are obtained as:

$$y_L(n) = \sum_{i=0}^{\tau_L-1} h(i)x(2n-i)$$

and $$y_H = \sum_{i=0}^{\tau_H-1} g(i)x(2n-i).$$

9. The apparatus of claim 7 wherein the lifting-based DWT is a scheme according to (S1) $Y_{2n+1}=X_{2n+1}+\alpha \times (X_{2n}+X_{2n+2})$ $\alpha=-1.586134342$, (S2) $Y_{2n}=X_{2n}+\beta \times (Y_{2n-1}+Y_{2n+1})$ $\beta=-0.052980118$, (S3) $Y_{2n+1}=Y_{2n+1}+\gamma \times (Y_{2n}+Y_{2n+2})$ $\gamma=0.882911075$, (S4) $Y_{2n}=Y_{2n}+\delta \times (Y_{2n-1}+Y_{2n+1})$ $\delta=0.443506852$, (S5) $Y_{2n+1}=-K \times Y_{2n+1}$ $K=1.230174105$, and (S6) $Y_{2n}=Y_{2n}/K$.

10. The apparatus of claim 6, wherein the selection of the convolution DWT or the lifting-based DWT is determined based on speed of operation.

11. An apparatus for processing a high speed image, comprising:
a GPU in communication with a memory, the memory providing instruction to the GPU for performing:
a 3-dimensional geometry transformation to transform 3-dimensional vertexes into 2-dimensional coordinate system and determining vertex colors based on illumination and reflection properties;
aligning data output from the vertex shader and transforming the aligned data into fragments; and
shading operations based on the fragments using texture data of a video memory,
wherein the shading comprises at least one Framebuffer Object (FBO) which is provided with the input image for the image processing in a texture format of 32 bit floating point, performing a predetermined convolution-based Discrete Wavelet Transform (DWT) or a lifting-based DWT algorithm for the image processing on the input image including that each FBO is previously prepared for a horizontal DWT and a vertical DWT and outputting the result as texture data so as to be reused.

12. The apparatus of claim 11, wherein the selection of the convolution DWT or the lifting-based DWT is determined based on speed of operation.

13. The apparatus of claim 12 wherein the lifting-based DWT is a scheme according to (S1) $Y_{2n+1}=X_{2n+1}+\alpha \times (X_{2n}+X_{2n+2})$ $\alpha=-1.586134342$, (S2) $Y_{2n}=X_{2n}+\beta \times (Y_{2n-1}+Y_{2n+1})$ $\beta=-0.052980118$, (S3) $Y_{2n+1}=Y_{2n+1}+\gamma \times (Y_{2n}+Y_{2n+2})$ $\gamma=0.882911075$, (S4) $Y_{2n}=Y_{2n}+\delta \times (Y_{2n-1}+Y_{2n+1})$ $\delta=0.443506852$, (S5) $Y_{2n+1}=-K \times Y_{2n+1}$ $K=1.230174105$, and (S6) $Y_{2n}=Y_{2n}/K$.

14. The apparatus of claim 11, further comprising:
obtaining a low frequency component $y_L(n)$ and a high frequency component $y_H(n)$ of an input signal $x(n)$, respectively, for the convolution-based DWT.

15. The apparatus of claim 14, wherein the low frequency and high frequency components are obtained as:

$$y_L(n) = \sum_{i=0}^{\tau_L-1} h(i)x(2n-i)$$

and $$y_H = \sum_{i=0}^{\tau_H-1} g(i)x(2n-i).$$

\* \* \* \* \*

UNITED STATES PATENT AND TRADEMARK OFFICE
CERTIFICATE OF CORRECTION

PATENT NO. : 8,325,197 B2
APPLICATION NO. : 12/012697
DATED : December 4, 2012
INVENTOR(S) : Seok-Jin Won et al.

It is certified that error appears in the above-identified patent and that said Letters Patent is hereby corrected as shown below:

In the Claims:

Column 10, Claim 2, Line 14 should read as follows:

$$--\ldots\quad y_H(n) = \sum_{i=0}^{r_{h_n}-1} g(i)x(2n-i) \quad\ldots--$$

Column 12, Claim 15, Line 38 should read as follows:

$$--\ldots\quad y_H(n) = \sum_{i=0}^{r_{h_n}-1} g(i)x(2n-i) \quad\ldots--$$

Signed and Sealed this
Eighteenth Day of June, 2013

Teresa Stanek Rea
*Acting Director of the United States Patent and Trademark Office*